US012544031B2

(12) United States Patent
Sugahara

(10) Patent No.: US 12,544,031 B2
(45) Date of Patent: Feb. 10, 2026

(54) INFORMATION PROCESSING DEVICE, INFORMATION PROCESSING METHOD, PROGRAM, AND RADIOGRAPHIC IMAGING SYSTEM

(71) Applicant: FUJIFILM CORPORATION, Tokyo (JP)

(72) Inventor: Masataka Sugahara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 139 days.

(21) Appl. No.: 18/461,513

(22) Filed: Sep. 6, 2023

(65) Prior Publication Data

US 2023/0404515 A1    Dec. 21, 2023

Related U.S. Application Data

(63) Continuation of application No. PCT/JP2022/011735, filed on Mar. 15, 2022.

(30) Foreign Application Priority Data

Mar. 17, 2021   (JP) ................................ 2021-044107

(51) Int. Cl.
*A61B 6/00* (2024.01)
*G01S 17/894* (2020.01)
(52) U.S. Cl.
CPC .............. *A61B 6/544* (2013.01); *A61B 6/488* (2013.01); *G01S 17/894* (2020.01)
(58) Field of Classification Search
None
See application file for complete search history.

(56) References Cited

U.S. PATENT DOCUMENTS 11,278,253 B2\* 3/2022 Sato ....................... A61B 6/588
2014/0086391 A1\* 3/2014 Ohta ..................... A61B 6/4283
378/91

(Continued)

FOREIGN PATENT DOCUMENTS

EP          3671111 A1    6/2020
JP       2017-136299 A    8/2017

(Continued)

OTHER PUBLICATIONS

International Search Report issued in International Application No. PCT/JP2022/011735 on May 24, 2022.

(Continued)

*Primary Examiner* — David J Makiya
*Assistant Examiner* — Soorena Kefayati
(74) *Attorney, Agent, or Firm* — SOLARIS Intellectual Property Group, PLLC

(57) ABSTRACT

An information processing device is configured to execute: distance image acquisition processing of acquiring a distance image generated by imaging an imaging range including a subject and a detection surface with a distance image capturing device; detection surface region search processing of searching the distance image for a detection surface region where a part of the detection surface exists; first distance acquisition processing of acquiring a distance to the detection surface region that has been searched for, as a first distance from the distance image capturing device to the detection surface, based on the distance image; second distance acquisition processing of acquiring a distance from the distance image capturing device to the subject as a second distance based on the distance image; and body thickness derivation processing of deriving a difference between the first distance and the second distance as a body thickness of the subject.

12 Claims, 13 Drawing Sheets

(56) References Cited

U.S. PATENT DOCUMENTS

| | | | |
|---|---|---|---|
| 2015/0185340 A1* | 7/2015 | Ye .......................... | H05G 1/02 |
| | | | 378/206 |
| 2016/0287194 A1* | 10/2016 | Nariyuki ............. | A61B 6/4411 |
| 2016/0331334 A1* | 11/2016 | Imamura ................. | A61B 6/06 |
| 2017/0007196 A1* | 1/2017 | Don ....................... | A61B 6/461 |
| 2018/0116623 A1* | 5/2018 | Inoue .................... | A61B 6/547 |
| 2018/0146937 A1* | 5/2018 | Nariyuki ............. | A61B 6/4452 |
| 2019/0059829 A1* | 2/2019 | Han ...................... | A61B 6/469 |
| 2020/0058389 A1* | 2/2020 | Saalbach ................. | G06N 3/09 |
| 2021/0161501 A1 | 6/2021 | Sendai | |

FOREIGN PATENT DOCUMENTS

| | | |
|---|---|---|
| JP | 2017-136300 A | 8/2017 |
| JP | 2018-196791 A | 12/2018 |
| WO | 2013/015265 A1 | 1/2013 |
| WO | 2020/036225 A1 | 2/2020 |

OTHER PUBLICATIONS

Written Opinion of the ISA issued in International Application No. PCT/JP2022/011735 on May 24, 2022.
Extended European Search Report dated Jul. 3, 2024, issued in corresponding EP Patent Application No. 22771450.8.
English langusge translation of the following: Office action dated Jan. 6, 2026 from the JPO in a Japanese patent application No. 2023-507139 corresponding to the instant patent application, \* cited by examiner

FIG. 10

IMAGING CONDITION TABLE

| BODY THICKNESS BT (cm) | IMAGING SITE SP |
|---|---|
| | ABDOMEN |
| ... | ... |
| 20 | 76 kV, 32 mAs |
| 25 | 78 kV, 36 mAs |
| 30 | 80 kV, 40 mAs |
| ... | ... |

| BODY THICKNESS BT (cm) | IMAGING SITE SP |
|---|---|
| | FRONTAL CHEST PORTION |
| ... | ... |
| 15 | 118 kV, 3.0 mAs |
| 20 | 120 kV, 3.2 mAs |
| 25 | 122 kV, 3.4 mAs |
| ... | ... |

FIG. 13

| PHYSIQUE | BODY THICKNESS BT (cm) | IMAGING SITE |
|---|---|---|
| | | ABDOMEN |
| SMALL | BT ≤ 22.5 | 76 kV, 32 mAs |
| MEDIUM | 22.5 < BT ≤ 27.5 | 78 kV, 36 mAs |
| LARGE | 27.5 < BT | 80 kV, 40 mAs |

IMAGING CONDITION TABLE (ST)

INFORMATION PROCESSING DEVICE, INFORMATION PROCESSING METHOD, PROGRAM, AND RADIOGRAPHIC IMAGING SYSTEM

CROSS-REFERENCE TO RELATED APPLICATIONS

This application is a continuation application of International Application No. PCT/JP2022/011735, filed Mar. 15, 2022, the disclosure of which is incorporated herein by reference in its entirety. Further, this application claims priority from Japanese Patent Application No. 2021-044107, filed on Mar. 17, 2021, the disclosure of which is incorporated herein by reference in its entirety.

BACKGROUND

1. Technical Field

The technology of the present disclosure relates to an information processing device, an information processing method, a program, and a radiographic imaging system.

2. Description of the Related Art

In radiographic imaging, it is desirable to appropriately set radiographic imaging conditions according to a body thickness of a subject such as a patient. The radiographic imaging conditions include a tube voltage, a tube current time product, and the like of a radiation source. It is desirable to set the radiographic imaging conditions such that the radiographic imaging is performed with an appropriate radiation dose corresponding to the body thickness of the subject in order to obtain clinically sufficient image quality and to suppress excessive radiation exposure to the subject.

The body thickness of the subject varies depending on the subject to be subjected to radiographic imaging. Therefore, in order to appropriately set the radiographic imaging conditions, it is necessary to accurately measure the body thickness of the subject. JP2017-136300A and JP2018-196791A disclose a method of measuring a body thickness of a subject.

JP2017-136300A discloses that the body thickness of the subject is calculated based on distance image information obtained by performing optical imaging of the subject. More specifically, JP2017-136300A discloses that the body thickness of the subject is calculated based on a first distance from the optical sensor to an irradiation side of the subject and a second distance from the optical sensor to an imaging table, from the distance image information obtained by the optical sensor.

JP2018-196791A discloses that a source image receptor distance (SID), which is a distance between a radiation irradiation device (that is, a radiation source) and a surface of a radiation detector, and a source object distance (SOD), which is a distance between the radiation irradiation device and a surface of the subject, are measured by a distance sensor, and that the body thickness of the subject is obtained by subtracting the SOD from the SID.

SUMMARY

The technologies disclosed in JP2017-136300A and JP2018-196791A each relate to a technology for calculating the body thickness of the subject by obtaining a difference between a first distance from a sensor for measuring a distance to a detection surface of a radiation detector and a second distance from the sensor to the subject.

However, the subject being positioned on the detection surface during the radiographic imaging may cause interference, which may make it difficult to obtain the first distance from the distance information obtained by the sensor. Although it is conceivable to measure the first distance in advance, there may be cases where the first distance varies with each radiographic imaging. In particular, in a radiographic imaging apparatus in which the radiation source and the radiation detector are independent of each other, there may be variations in the first distance each time an imaging technician prepares for radiographic imaging. Therefore, it is not possible to measure the first distance in advance.

JP2017-136300A and JP2018-196791A do not disclose a specific method for obtaining the first distance. Therefore, the body thickness of the subject cannot be accurately obtained by the technologies disclosed in JP2017-136300A and JP2018-196791A.

An object of the technology of the present disclosure is to provide an information processing device, an information processing method, a program, and a radiographic imaging system capable of accurately obtaining a body thickness of a subject.

In order to achieve the above-described object, according to the present disclosure, there is provided an information processing device that is used for a radiographic imaging system including a radiation source and a radiation image detector having a detection surface to which radiation from the radiation source is emitted and on which a subject is positioned, and that performs processing of deriving a body thickness of the subject, the information processing device comprising: a processor, in which the processor is configured to execute: distance image acquisition processing of acquiring a distance image generated by imaging an imaging range including the subject and the detection surface with a distance image capturing device; detection surface region search processing of searching the distance image for a detection surface region where a part of the detection surface exists; first distance acquisition processing of acquiring a distance to the detection surface region that has been searched for, as a first distance from the distance image capturing device to the detection surface, based on the distance image; second distance acquisition processing of acquiring a distance from the distance image capturing device to the subject as a second distance based on the distance image; and body thickness derivation processing of deriving a difference between the first distance and the second distance as the body thickness of the subject.

It is preferable that the processor is configured to: in the second distance acquisition processing, acquire a distance to radiation center coordinates corresponding to a center of a radiation beam emitted from the radiation source toward the subject as the second distance based on the distance image.

It is preferable that the processor is configured to: in the second distance acquisition processing, derive the radiation center coordinates based on a relative positional relationship between the distance image capturing device and the radiation source.

It is preferable that the processor is configured to: in the detection surface region search processing, set a region of interest where the detection surface region is estimated to exist, based on a provisionally set value provisionally set as a value corresponding to the first distance and a size of the detection surface; and search for the detection surface region using the set region of interest as a search range.

It is preferable that the processor is configured to: in the detection surface region search processing, exclude an abnormal pixel having an abnormal pixel value from the region of interest; and among regions where the abnormal pixels are excluded from the region of interest, derive a region having a maximum distance as the detection surface region.

It is preferable that the region of interest is a region including an end portion of the radiation image detector and a background outside the radiation image detector.

It is preferable that the processor is configured to: in the detection surface region search processing, exclude, from the region of interest, a pixel that has a distance equal to or greater than a certain value and corresponds to the background and a flying pixel that appears at a boundary part between the end portion and the background, as the abnormal pixels.

It is preferable that the processor is configured to: in the detection surface region search processing, set a position of the region of interest according to an imaging site of the subject.

It is preferable that the distance image capturing device is a TOF type distance image camera.

According to the present disclosure, there is provided a radiographic imaging system comprising: the information processing device according to any one of the above, in which a radiographic imaging condition is decided on based on the body thickness derived by the body thickness derivation processing.

It is preferable that the decided-on radiographic imaging condition is changeable by a user's operation.

According to the present disclosure, there is provided an information processing method that is used for a radiographic imaging system including a radiation source and a radiation image detector having a detection surface to which radiation from the radiation source is emitted and on which a subject is positioned, and that includes deriving a body thickness of the subject, the information processing method comprising: acquiring a distance image generated by imaging an imaging range including the subject and the detection surface with a distance image capturing device; searching the distance image for a detection surface region where a part of the detection surface exists; acquiring a distance to the detection surface region that has been searched for, as a first distance from the distance image capturing device to the detection surface, based on the distance image; acquiring a distance from the distance image capturing device to the subject as a second distance based on the distance image; and deriving a difference between the first distance and the second distance as the body thickness of the subject.

According to the present disclosure, there is provided a program that is used for a radiographic imaging system including a radiation source and a radiation image detector having a detection surface to which radiation from the radiation source is emitted and on which a subject is positioned, the program causing a computer to execute a process including deriving a body thickness of the subject, the process comprising: acquiring a distance image generated by imaging an imaging range including the subject and the detection surface with a distance image capturing device; searching the distance image for a detection surface region where a part of the detection surface exists; acquiring a distance to the detection surface region that has been searched for, as a first distance from the distance image capturing device to the detection surface, based on the distance image; acquiring a distance from the distance image capturing device to the subject as a second distance based on the distance image; and deriving a difference between the first distance and the second distance as the body thickness of the subject.

According to the technology of the present disclosure, it is possible to provide an information processing device, an information processing method, a program, and a radiographic imaging system capable of accurately obtaining a body thickness of a subject.

BRIEF DESCRIPTION OF THE DRAWINGS

Exemplary embodiments according to the technique of the present disclosure will be described in detail based on the following figures, wherein:

FIG. 10 is a diagram showing an example of an imaging condition table, FIG. 13 is a diagram showing a modification example of the imaging condition table.

DETAILED DESCRIPTION

Figure 1:
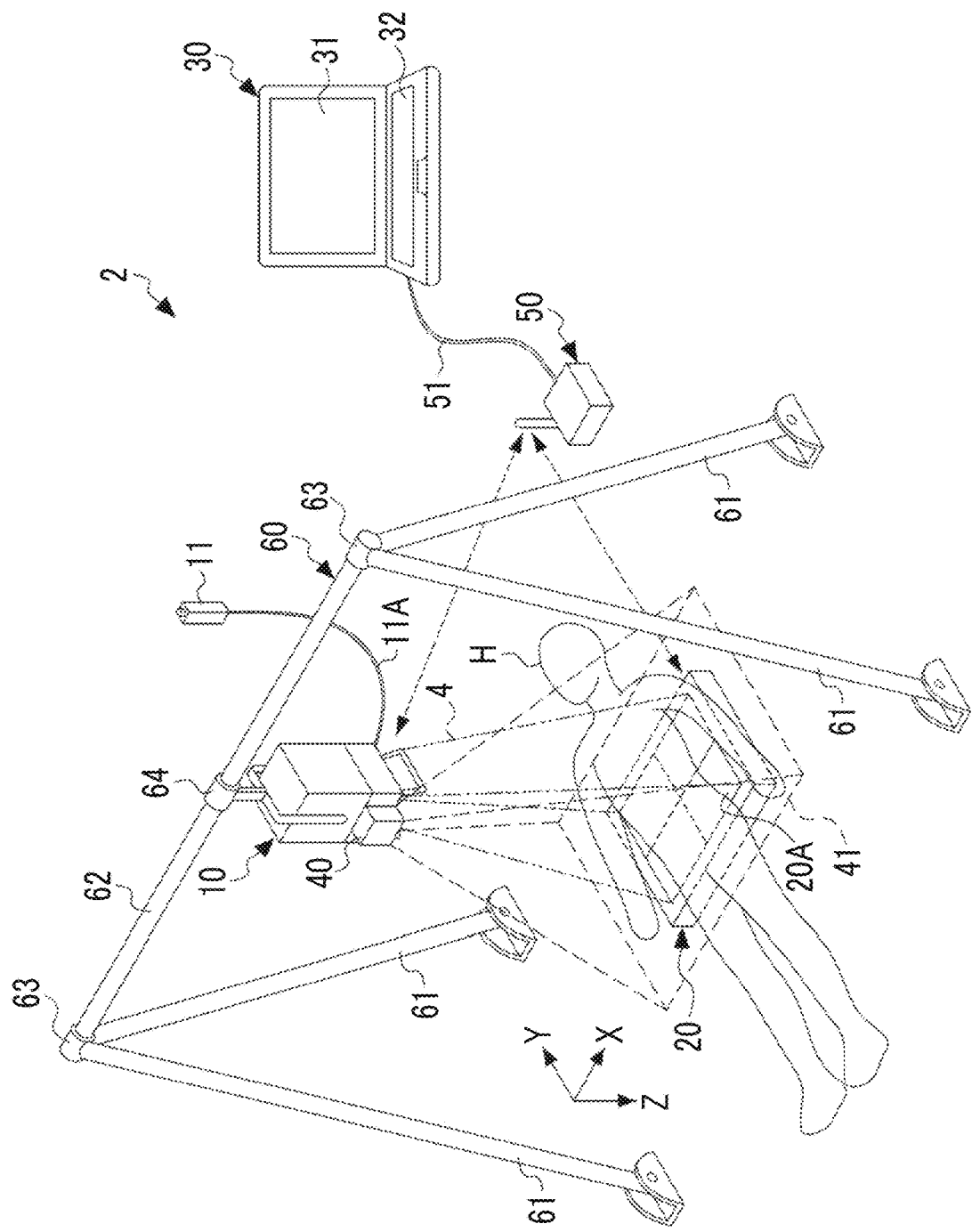
FIG. 1 is a diagram showing an example of a configuration of an X-ray imaging system.

FIG. 1 shows an example of a configuration of an X-ray imaging system 2 using an X-ray as radiation. The X-ray imaging system 2 using an X-ray as radiation comprises an X-ray source 10, an X-ray image detector 20, a console 30, and a repeater 50. A distance image camera 40 is attached to the X-ray source 10. The console 30 communicates with the X-ray source 10, the X-ray image detector 20, and the distance image camera 40 via the repeater 50. The repeater 50 functions as, for example, an access point.

The X-ray source 10 is an example of a radiation source that generates radiation. The X-ray image detector 20 is an example of a "radiation image detector" that generates a radiation image by detecting radiation.

The X-ray source 10, the X-ray image detector 20, and the console 30 of the present embodiment are each a small and portable device. In the X-ray imaging system 2 of the present embodiment, these devices can be carried to a field where emergency medical response, such as an accident or a disaster, is required or a home of a patient who receives home medical care to perform X-ray imaging.

In the X-ray imaging system 2, the X-ray image detector 20 is disposed at a position where a detection surface 20A thereof faces the X-ray source 10. By disposing a subject H between the X-ray source 10 and the X-ray image detector 20, it is possible to perform X-ray imaging on an imaging site of the subject H. In the example shown in FIG. 1, the imaging site of the subject H is an abdomen.

The X-ray source 10 is held by, for example, a holding device 60. The holding device 60 is, for example, a quadruped having four support legs 61 and a horizontal bar 62. The upper ends of the support legs 61 and both ends of the horizontal bar 62 are each connected to a three-pronged joint 63, whereby the holding device 60 is assembled. The horizontal bar 62 is provided with an attachment bracket 64 for mechanically attaching the X-ray source 10. The X-ray source 10 is suspended by the attachment bracket 64 such that an irradiation direction of an X-ray 4 is directed downward.

An irradiation switch 11 is connected to the X-ray source 10 via a cable 11A. A user, such as a radiologist or a doctor, who uses the X-ray imaging system 2 can start irradiation of the X-ray 4 from the X-ray source 10 by operating the irradiation switch 11.

The X-ray image detector 20 has an automatic X-ray detection function of detecting the start of irradiation of the X-ray 4 emitted from the X-ray source 10. Therefore, the X-ray image detector 20 does not need to be connected to the X-ray source 10. Further, since the X-ray image detector 20 has a built-in battery and a wireless communication function, the X-ray image detector 20 does not need to be connected to a power supply or the console 30 via a cable. The X-ray image detector 20 is wirelessly connected to the repeater 50 and communicates with the console 30 via the repeater 50.

The console 30 is composed of, for example, a personal computer and has a display unit 31 and an input operation unit 32. The console 30 is connected to the repeater 50 via, for example, a communication cable 51. The display unit 31 is a display device, such as a liquid crystal display or an organic electro luminescence (EL) display. The input operation unit 32 is an input device including a keyboard, a mouse, a touch pad, or the like. The console 30 is an example of an "information processing device" according to the technology of the present disclosure.

The user can input patient information, an imaging site, an imaging condition, and the like by operating the input operation unit 32. The display unit 31 displays an X-ray image received by the console 30 from the X-ray image detector 20.

The distance image camera 40 is disposed, for example, in the vicinity of an irradiation field limiter 17 provided in the X-ray source 10. For example, the distance image camera 40 is a time of flight (TOF) type distance image camera. Specifically, the distance image camera 40 emits illumination light such as infrared rays toward an imaging target and measures a time from the emission of the illumination light to the reception of the reflected light, thereby measuring a distance between the distance image camera 40 and the imaging target. The distance image camera 40 may emit illumination light such as amplitude-modulated infrared rays toward the imaging target and measure the distance between the imaging target and the distance image camera 40 based on a phase delay amount of the reflected light with respect to the illumination light. In addition, the distance image camera 40 may be a laser scanning type TOF camera that measures a distance by scanning an imaging target with laser light.

The distance image captured by the distance image camera 40 has distance information indicating the distance between the distance image camera 40 and the imaging target for each pixel. The distance image refers to an image having distance information that enables derivation of a distance to an imaging target. The distance image camera 40 is an example of a "distance image capturing device" according to the technology of the present disclosure.

In the present embodiment, as shown in FIG. 1, the distance image camera 40 captures the distance image with a region including an imaging site of the subject H and the detection surface 20A of the X-ray image detector 20 as an imaging range 41. For example, the imaging range 41 is a rectangular region larger than the detection surface 20A.

The X-ray source 10 and the distance image camera 40 are wirelessly connected to the repeater 50 and communicate with the console 30 via the repeater 50. A distance image DP (see FIG. 2) generated by the distance image camera 40 is transmitted to the console 30 via the repeater 50. In the present embodiment, the console 30 derives a body thickness of the subject H at the imaging site (hereinafter, simply referred to as the body thickness of the subject H) based on the distance image DP received from the distance image camera 40.

In addition, the console 30 decides on an X-ray imaging condition SC based on the derived body thickness and transmits the decided-on X-ray imaging condition SC to the X-ray source 10 via the repeater 50. The X-ray imaging condition SC includes a tube voltage, a tube current time product, and the like. The X-ray source 10 generates the X-ray 4 based on the X-ray imaging condition SC received from the console 30 and emits the generated X-ray 4 toward the X-ray image detector 20.

Figure 2:
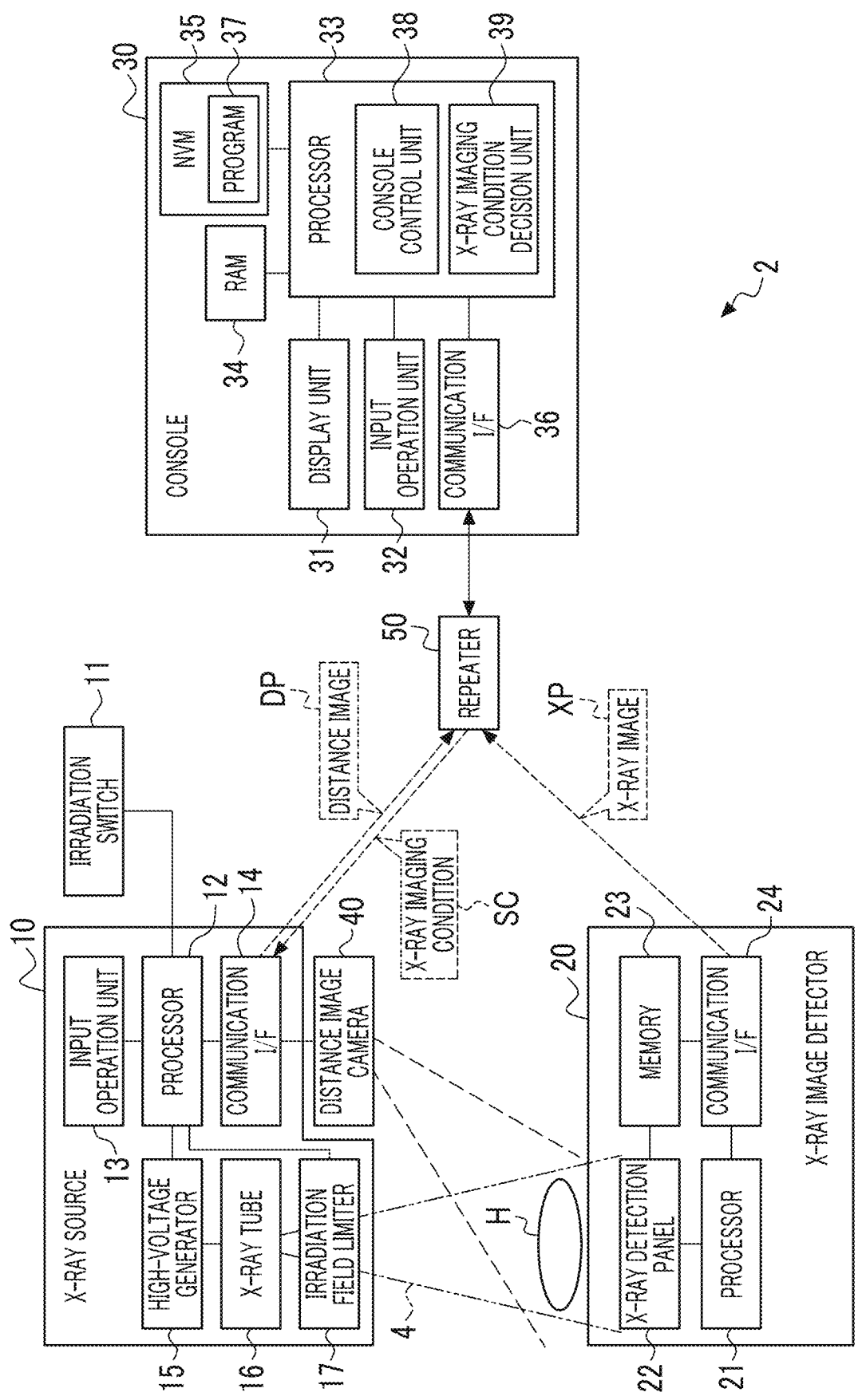
FIG. 2 is a block diagram showing an example of a hardware configuration of the X-ray imaging system.

FIG. 2 shows an example of a hardware configuration of the X-ray imaging system 2. The X-ray source 10 has a processor 12, an input operation unit 13, a communication interface (I/F) 14, a high-voltage generator 15, an X-ray tube 16, and the irradiation field limiter 17. The processor 12 functions as a control unit that controls the operations of the high-voltage generator 15 and of the irradiation field limiter 17. The above-described irradiation switch 11 is connected to the processor 12. In addition, the input operation unit 13 is connected. The input operation unit 13 includes an imaging condition adjustment button for manually setting a tube voltage and a tube current time product of the X-ray tube 16, an irradiation field button for adjusting the size of an irradiation field of the irradiation field limiter 17, a power button, and the like.

The processor 12 controls the high-voltage generator 15 and the irradiation field limiter 17 based on set conditions set via the input operation unit 13. The processor 12 causes the high-voltage generator 15 to generate a high voltage in response to the operation of the irradiation switch 11. The communication I/F 14 is wirelessly connected to the repeater 50.

The X-ray tube 16 is, for example, a fixed anode type X-ray tube that does not have a rotation mechanism of a target. The X-ray tube 16 is composed of a cold cathode electron source that emits electrons, an electron accelerator, a target that generates the X-ray 4 by colliding electrons, and an exterior tube that houses these. The cold cathode electron source does not require a filament and a heater that heats the filament, as in a case of a hot cathode. The X-ray tube 16 is compact and lightweight because the X-ray tube 16 does not have a rotation mechanism of the target and also does not have the filament and the heater. In addition, since the X-ray tube 16 does not require residual heat of the filament, it is possible to immediately generate the X-ray 4 in response to an irradiation start instruction.

The irradiation field limiter 17 limits the irradiation field of the X-ray 4 generated by the X-ray tube 16. The X-ray 4 generated by the X-ray tube 16 is emitted to the imaging site of the subject H by limiting the irradiation field through the irradiation field limiter 17. The X-ray 4 transmitted through the imaging site of the subject H is incident on the X-ray image detector 20.

The distance image camera 40 is connected to, for example, the communication I/F 14 of the X-ray source 10. The distance image camera 40 transmits the distance image DP generated by imaging the imaging range 41 (see FIG. 1) to the console 30 via the communication I/F 14 and the repeater 50. The X-ray source 10 and the distance image camera 40 can also be connected to the repeater 50 in a wired manner via a communication cable.

The X-ray image detector 20 has a processor 21, an X-ray detection panel 22, a memory 23, and a communication I/F 24. The processor 21 functions as a control unit that controls each unit of the X-ray image detector 20. The X-ray detection panel 22 is, for example, a flat panel detector having a matrix substrate in which a plurality of pixels consisting of a thin film transistor (TFT) and an X-ray detection element are two-dimensionally arranged.

The X-ray detection panel 22 converts incident X-rays in a charge accumulation state in which the TFT is turned off into charges and accumulates the charges through the X-ray detection element. Then, in the X-ray detection panel 22, the charges accumulated by the X-ray detection element are read out by a signal processing circuit in a charge read-out state in which the TFT is turned on. In the signal processing circuit, the read-out charges are converted into voltage signals by an integrating amplifier, and the converted voltage signals are subjected to A/D conversion by an A/D converter, whereby digital image data is generated. Hereinafter, the image data will be referred to as an X-ray image XP.

The memory 23 is a non-volatile memory, such as a flash memory, and stores the X-ray image XP generated by the X-ray detection panel 22. The communication OF 24 is wirelessly connected to the repeater 50. The processor 21 transmits the X-ray image XP stored in the memory 23 to the console 30 via the repeater 50. The X-ray image detector 20 can also be connected to the repeater 50 in a wired manner via a communication cable.

The console 30 comprises the display unit 31, the input operation unit 32, a processor 33, a random access memory (RAM) 34, a non-volatile memory (NVM) 35, and a communication OF 36. The processor 33 is, for example, a central processing unit (CPU). The RAM 34 is a work memory for the processor 33 to execute processing. The NVM 35 is a storage device, such as a flash memory, and stores a program 37. The console 30 is an example of a "computer" according to the technology of the present disclosure.

The processor 33 loads the program 37 stored in the NVM 35 into the RAM 34 and executes processing in accordance with the program 37, thereby functioning as a console control unit 38 that collectively controls each unit of the console 30, and an X-ray imaging condition decision unit 39.

The console control unit 38 displays a graphical user interface (GUI) screen on the display unit 31, thereby enabling the input of the patient information, the imaging site, and the like using the input operation unit 32. In addition, the console control unit 38 causes the display unit 31 to display the X-ray image XP received from the X-ray image detector 20.

The X-ray imaging condition decision unit 39 derives the body thickness of the subject H based on the distance image DP transmitted from the distance image camera 40 and decides on the X-ray imaging condition SC based on the derived body thickness.

Figure 3:
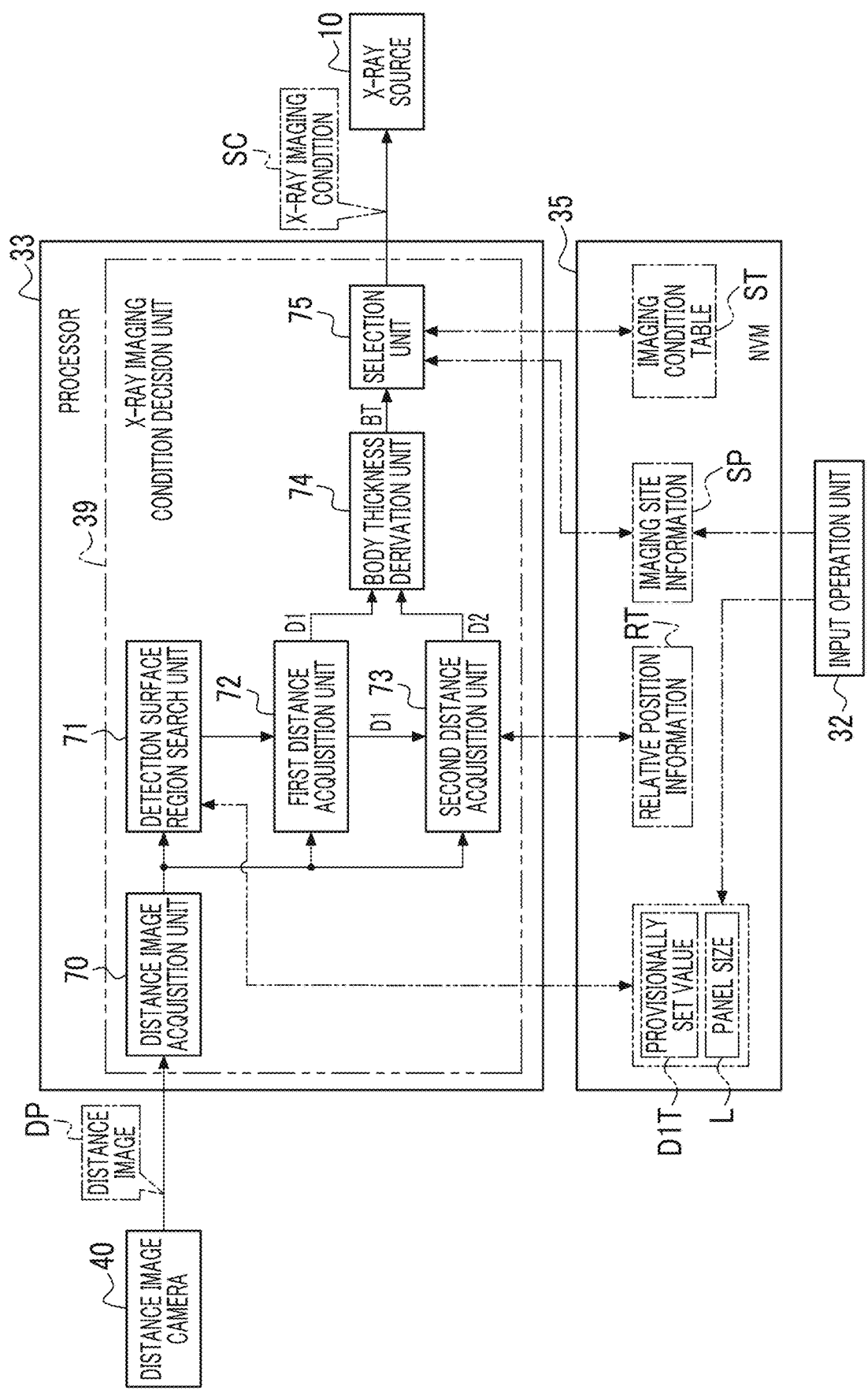
FIG. 3 is a block diagram showing an example of a functional configuration of an X-ray imaging condition decision unit.

FIG. 3 shows an example of a functional configuration of the X-ray imaging condition decision unit 39. The X-ray imaging condition decision unit 39 is composed of a distance image acquisition unit 70, a detection surface region search unit 71, a first distance acquisition unit 72, a second distance acquisition unit 73, a body thickness derivation unit 74, and a selection unit 75. The X-ray imaging condition decision unit 39 derives the body thickness and decides on the X-ray imaging condition based on information such as a provisionally set value D1T, a panel size L, relative position information RT, imaging site information SP, and an imaging condition table ST, all of which are stored in the NVM 35.

The distance image acquisition unit 70 performs distance image acquisition processing of acquiring the distance image DP transmitted from the distance image camera 40. The distance image acquisition unit 70 supplies the acquired distance image DP to the detection surface region search unit 71, the first distance acquisition unit 72, and the second distance acquisition unit 73.

Figure 4:
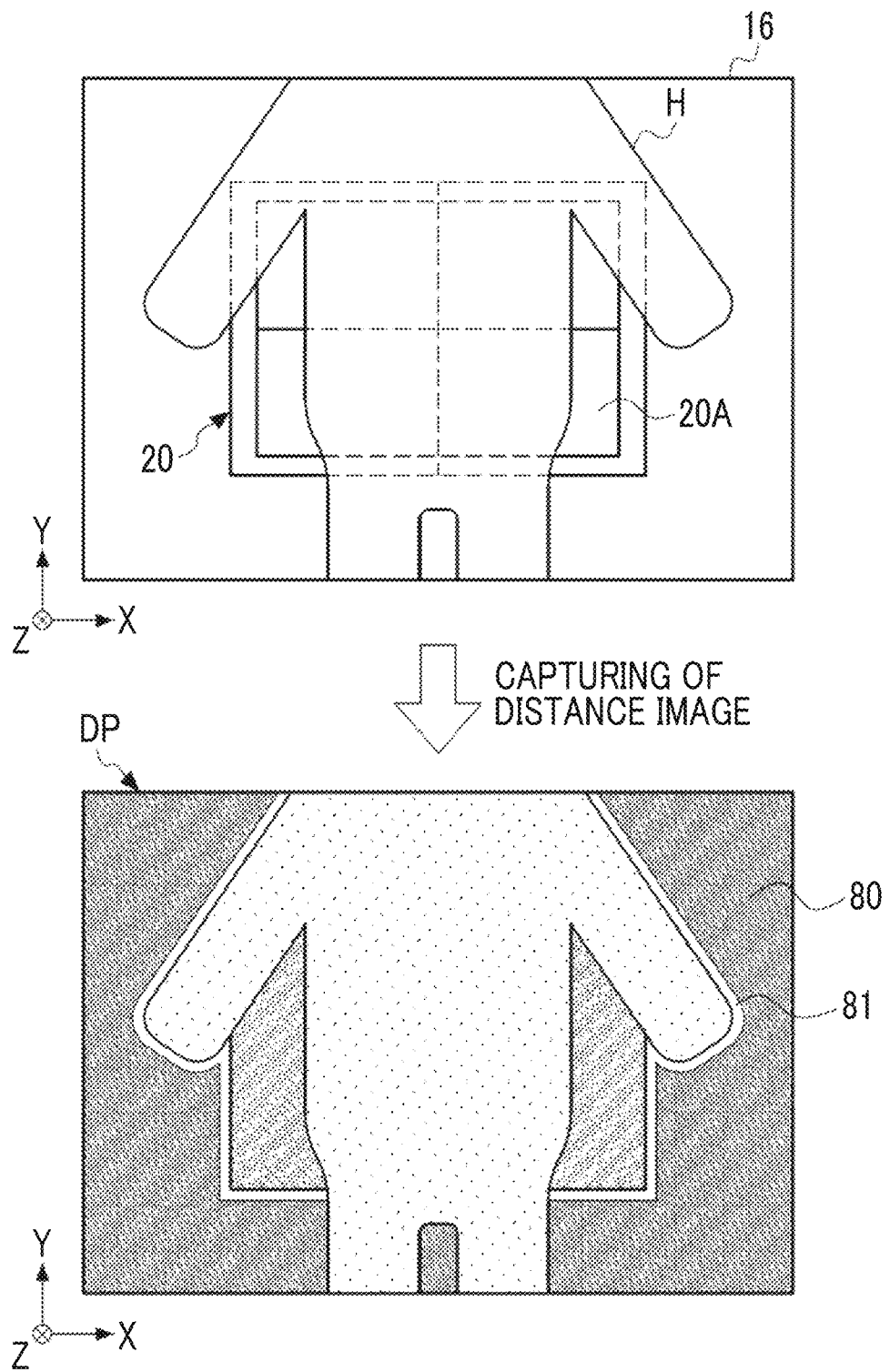
FIG. 4 is a diagram showing an example of a distance image generated by a distance image camera.

FIG. 4 shows an example of the distance image DP generated by the distance image camera 40. As shown in FIG. 4, the distance image camera 40 generates the distance image DP by imaging the imaging range 41 including the subject H and the detection surface 20A. In the distance image DP, the distance is represented by a density. A region having a higher density in the distance image DP indicates that the distance from the distance image camera 40 is longer.

In the distance image camera 40, a distance range in which distance measurement is possible is defined, and a first pixel region 80 including pixels in which a distance from the distance image camera 40 is equal to or greater than a certain value is set as a maximum density (for example, black). For example, the distance image camera 40 specifies a pixel region indicating a distance which is equal to or greater than a certain value and which is longer than the distance from the distance image camera 40 to the detection surface 20A, as the first pixel region 80.

In addition, the distance image camera 40 sets a second pixel region 81 including flying pixels generated at an end portion of an object as a minimum density (for example, white). The flying pixel is a "blurred" pixel that appears at a boundary part between an object and a background. The flying pixel is known, for example, in JP6143747B. In the example shown in FIG. 4, the second pixel region 81 is generated at the boundary part between the end portion of the X-ray image detector 20 and the background and the boundary part between the subject H and the background.

The specification and density change of the first pixel region 80 and of the second pixel region 81 from the distance image DP are not limited to being performed inside the distance image camera 40 and may be performed inside the console 30.

The detection surface region search unit 71 performs detection surface region search processing of searching the distance image DP for a detection surface region DA (see FIG. 5) where a part of the detection surface 20A exists.

Figure 5:
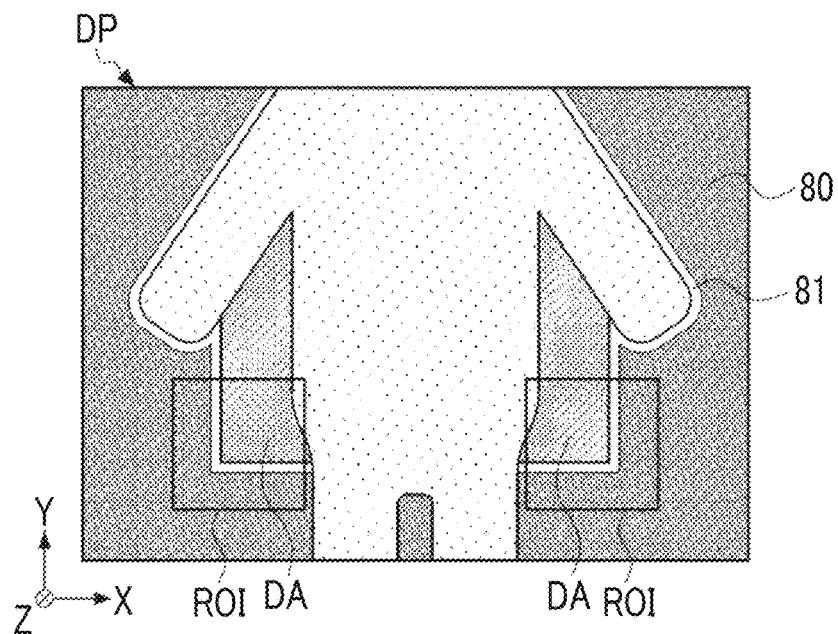
FIG. 5 is a diagram illustrating an example of detection surface region search processing.
Figure 6:
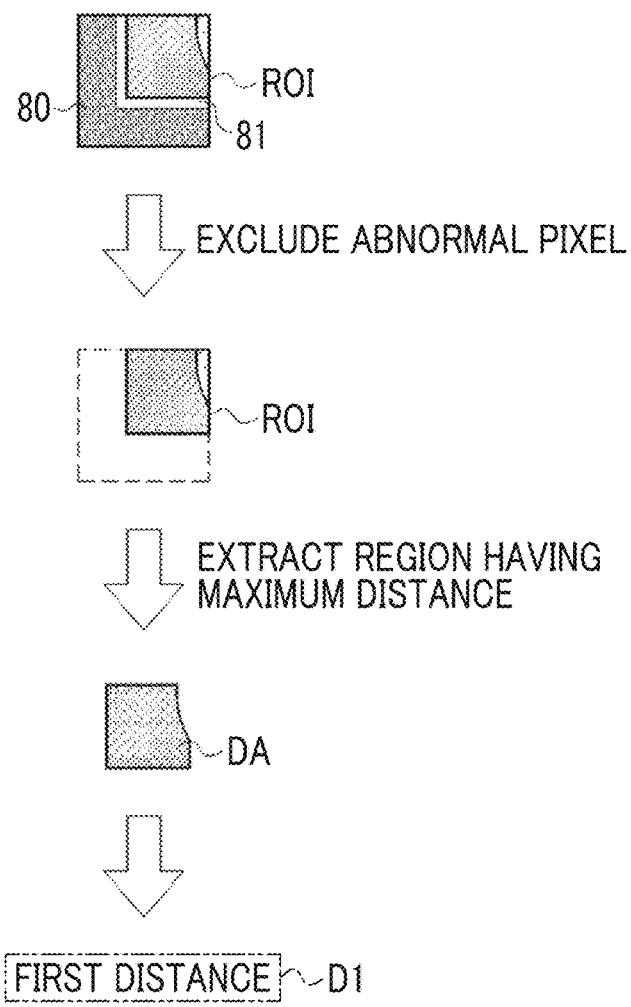
FIG. 6 is a diagram illustrating an example of the detection surface region search processing and first distance acquisition processing.

FIGS. 5 and 6 illustrate an example of the detection surface region search processing. As shown in FIG. 5, the detection surface region search unit 71 sets a region of interest ROI in a region in the distance image DP where the detection surface region DA is estimated to exist, and searches for the detection surface region DA using the set region of interest ROI as the search range. For example, the region of interest ROI has a rectangular shape. In addition, the region of interest ROI is smaller than a region corresponding to the detection surface 20A. The region of interest ROI is a region including the end portion of the X-ray image detector 20 and the background outside the X-ray image detector 20.

In the example shown in FIG. 5, the detection surface region search unit 71 sets the region of interest ROI to include a corner portion of the detection surface 20A. Further, in the example shown in FIG. 5, the imaging site of the subject H is the abdomen, and a part of the detection surface 20A is exposed on both sides of the waist of the subject H. Therefore, the detection surface region search unit 71 sets a pair of regions of interest ROI at positions located on both sides of the waist of the subject H and corresponding to the corner portions of the detection surface 20A. The detection surface region search unit 71 need only set at least one region of interest ROI in the distance image DP.

As shown in FIG. 6, the detection surface region search unit 71 excludes abnormal pixels having abnormal pixel values from the region of interest ROI. Specifically, the detection surface region search unit 71 excludes the first pixel region 80 having the maximum density and the second pixel region 81 having the minimum density from the region of interest ROI. Next, the detection surface region search unit 71 derives, among regions where the abnormal pixels are excluded, a region having a maximum distance in the region of interest ROI as the detection surface region DA. The region where the abnormal pixel is excluded may include a part of the subject H. However, since the subject H is located on a distance image camera 40 side with respect to the detection surface 20A, the distance to the subject H is shorter than the distance to the detection surface 20A. Therefore, the detection surface region DA corresponds to the detection surface 20A.

In a case where two or more regions of interest ROI are set in the distance image DP, the detection surface region search unit 71 searches each of the regions of interest ROI for the detection surface region DA.

The first distance acquisition unit 72 performs first distance acquisition processing of acquiring a distance to the detection surface region DA that the detection surface region search unit 71 has searched for, as a first distance D1 from the distance image camera 40 to the detection surface 20A, based on the distance image DP. In a case where the detection surface region search unit 71 extracts a plurality of detection surface regions DA and the distances are different for each detection surface region DA, the first distance acquisition unit 72 acquires the maximum distance as the first distance D1.

Figure 7:
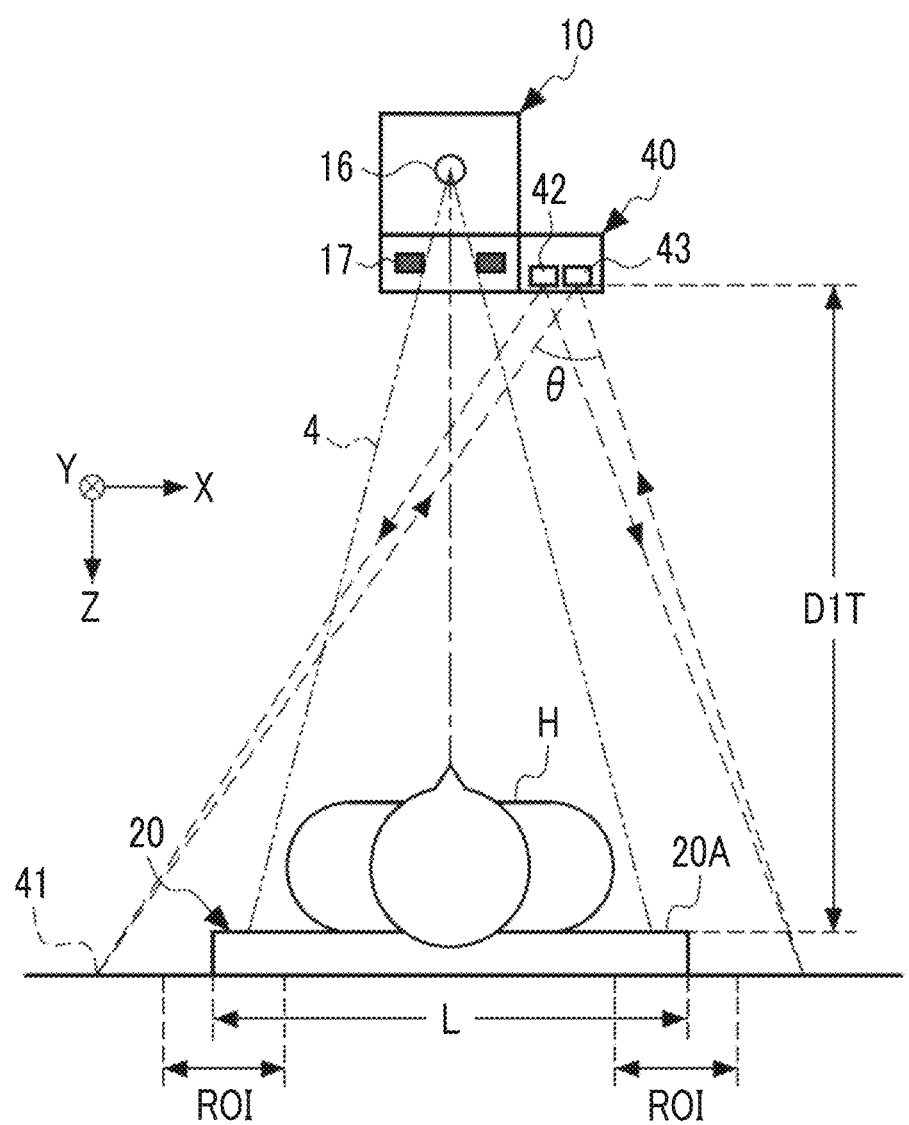
FIG. 7 is a diagram illustrating an example of the first distance acquisition processing.

FIG. 7 illustrates the details of setting processing of the region of interest ROI by the detection surface region search unit 71. The region in the distance image DP where the detection surface region DA is estimated to exist depends on the distance from the distance image camera 40 to the detection surface 20A and the size of the detection surface 20A. Therefore, in the present embodiment, the detection surface region search unit 71 sets the region of interest ROI based on the provisionally set value D1T and the panel size L, both of which are stored in the NVM 35. The provisionally set value D1T is a value provisionally set in advance as a value corresponding to the first distance D1. The panel size L corresponds to the size of the detection surface 20A and indicates, for example, the length of the detection surface in an X direction.

For example, the provisionally set value D1T is set based on the sizes of the holding device 60 and of the X-ray source 10. The provisionally set value D1T and the panel size L may be settable by the user using the input operation unit 32.

The distance image camera 40 includes a light source 42 that emits illumination light 42A such as infrared rays toward the imaging range 41, and an imaging sensor 43 that receives reflected light 43A from the imaging range 41. The imaging range 41 corresponds to an angle of view θ of the imaging sensor 43. The detection surface region search unit 71 obtains a position corresponding to the corner portion of the detection surface 20A from a geometrical relationship based on the provisionally set value D1T and the panel size L, and sets the region of interest ROI to include the corner portion of the detection surface 20A.

Figure 8:
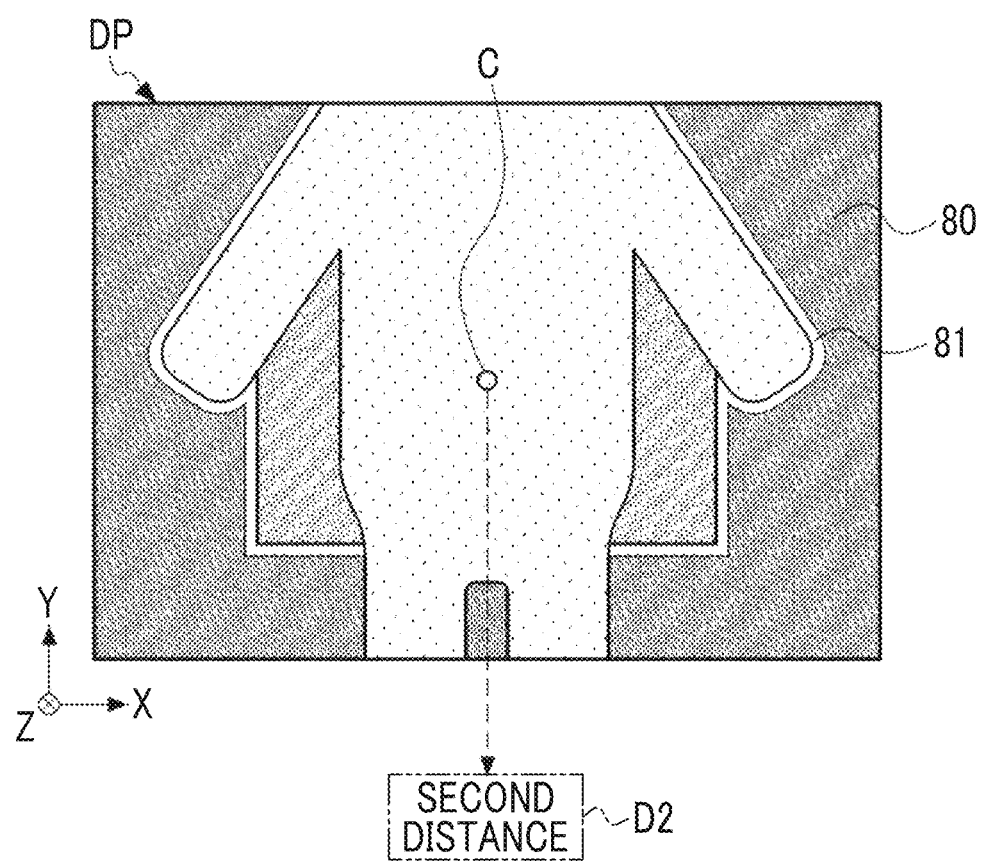
FIG. 8 is a diagram illustrating details of an example of setting processing of a region of interest by a detection surface region search unit.

The second distance acquisition unit 73 performs second distance acquisition processing of acquiring a distance from the distance image camera 40 to the subject H as a second distance D2 based on the distance image DP. Specifically, as shown in FIG. 8, the second distance acquisition unit 73 acquires a distance to X-ray center coordinates C corresponding to the center of the beam of the X-ray 4 emitted from the X-ray source 10 toward the subject H, as the second distance D2. More specifically, the second distance acquisition unit 73 derives the X-ray center coordinates C based on the relative position information RT (see FIG. 3) indicating the relative positional relationship (see FIG. 7) between the distance image camera 40 and the X-ray source and the first distance D1 acquired by the first distance acquisition unit 72, and acquires the distance to the derived X-ray center coordinates C as the second distance D2. The second distance acquisition unit 73 may derive the X-ray center coordinates C by using the provisionally set value D1T instead of the first distance D1. The X-ray center coordinates C are an example of "radiation center coordinates" according to the technology of the present disclosure.

Figure 9:
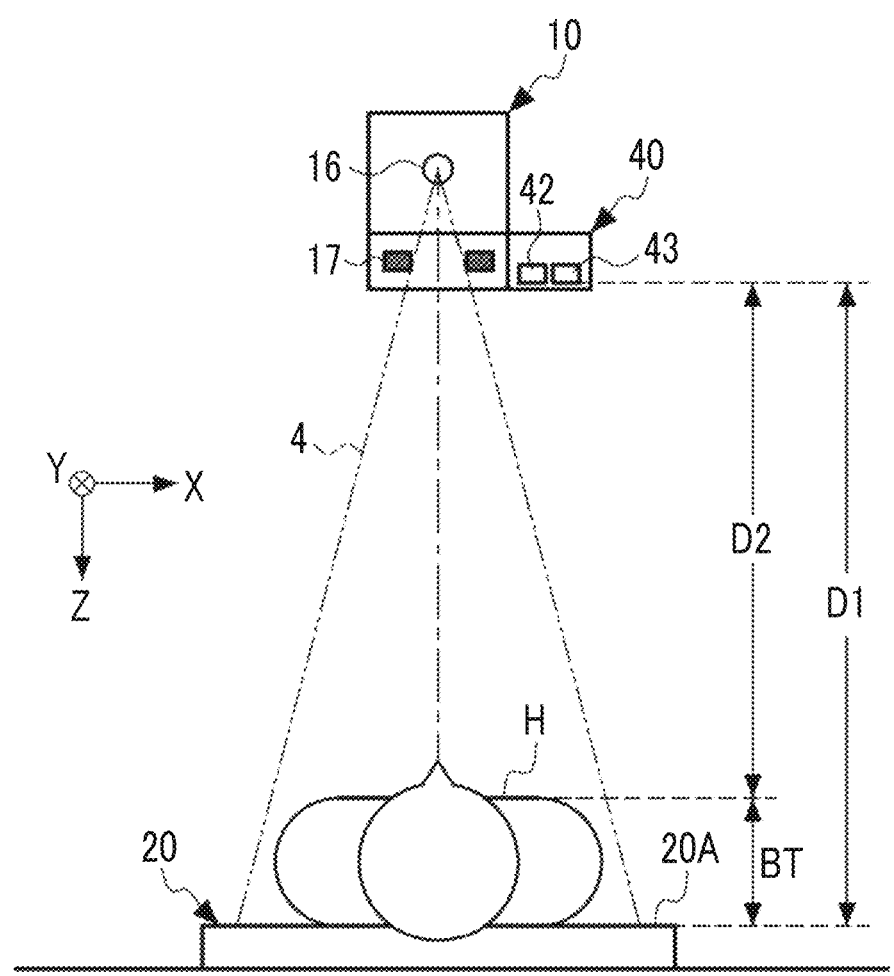
FIG. 9 is a diagram illustrating an example of body thickness derivation processing.

The body thickness derivation unit 74 performs body thickness derivation processing of deriving a difference between the first distance D1 acquired by the first distance acquisition unit 72 and the second distance D2 acquired by the second distance acquisition unit 73 as a body thickness BT (see FIG. 9). Specifically, as shown in FIG. 9, the body thickness derivation unit 74 derives the body thickness BT by subtracting the second distance D2 from the first distance D1.

The selection unit 75 decides on the X-ray imaging condition SC based on the body thickness BT derived by the body thickness derivation unit 74. Specifically, the selection unit selects the X-ray imaging condition SC corresponding to the imaging site indicated by the body thickness BT and the imaging site information SP from the imaging condition table ST stored in the NVM 35, and outputs the selected X-ray imaging condition SC to the X-ray source 10. The imaging site information SP may be settable by the user using the input operation unit 32. The X-ray imaging condition SC is an example of a "radiographic imaging condition" according to the technology of the present disclosure.

FIG. 10 shows an example of the imaging condition table ST. In the imaging condition table ST, the body thickness BT and the X-ray imaging condition SC are associated with each other for each imaging site. The selection unit 75 selects, from the imaging condition table ST, the X-ray imaging condition SC most suitable for the body thickness BT derived by the body thickness derivation unit 74 and the imaging site indicated by the imaging site information SP. The X-ray imaging condition SC is defined by, for example, the tube voltage and the tube current time product of the X-ray tube 16.

Figure 11:
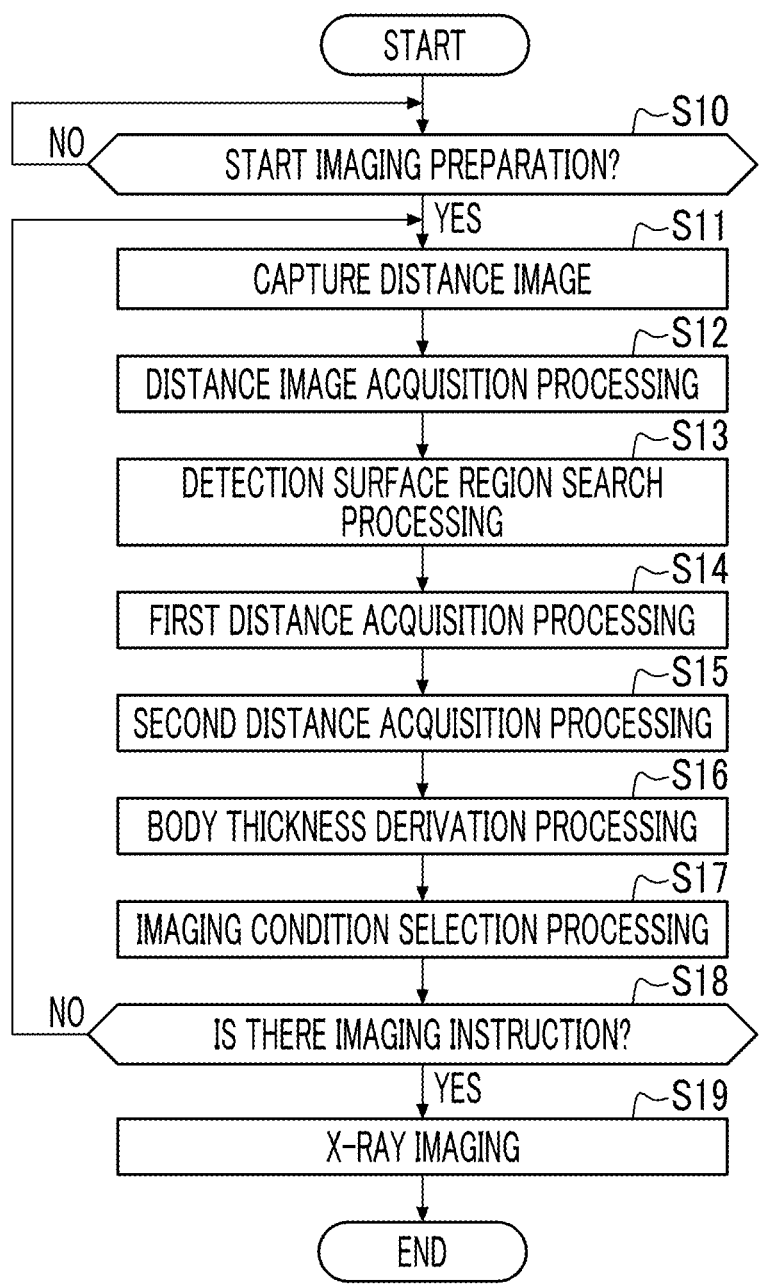
FIG. 11 is a diagram showing an example of a flow of processing by the X-ray imaging system.

Next, the operation of the X-ray imaging system 2 having the above-described configuration will be described with reference to the flowchart shown in FIG. 11.

Prior to imaging, the user such as a doctor performs an input operation of the patient information, the imaging site information SP, and the like on the X-ray source 10 and the console 30, and then positions the imaging site of the subject H with respect to the detection surface 20A of the X-ray image detector 20. In a case where the user performs an operation to start imaging preparation on the console 30 (step S10: YES), the distance image DP is captured by the distance image camera 40 (step S11). The distance image DP is transmitted from the distance image camera 40 to the console 30.

In the console 30, the distance image acquisition unit 70 performs the distance image acquisition processing of acquiring the distance image DP transmitted from the distance image camera 40 (step S12). In a case where the distance image DP is acquired by the distance image acquisition unit 70, the detection surface region search unit 71 performs the detection surface region search processing of searching the distance image DP for the detection surface region DA where a part of the detection surface 20A exists (step S13).

Next, the first distance acquisition unit 72 performs the first distance acquisition processing of acquiring the distance to the detection surface region DA that the detection surface region search unit 71 has searched for, as the first distance D1 from the distance image camera 40 to the detection surface 20A (step S14). The second distance acquisition unit 73 performs the second distance acquisition processing of acquiring the distance from the distance image camera 40 to the subject H as the second distance D2 based on the distance image DP (step S15).

Next, the body thickness derivation unit 74 performs the body thickness derivation processing of deriving the difference between the first distance D1 and the second distance D2 as the body thickness BT (step S16). Then, the selection unit 75 performs imaging condition selection processing of selecting the X-ray imaging condition SC from the imaging condition table ST based on the body thickness BT derived by the body thickness derivation unit 74 (step S17). The X-ray imaging condition SC selected by the selection unit 75 is transmitted to the X-ray source 10.

After that, in a case where the user operates the irradiation switch 11 to issue an imaging instruction to start the irradiation of the X-ray 4 to the X-ray source 10 (step S18: YES), the X-ray source 10 performs the irradiation of the X-ray 4 by using the X-ray imaging condition SC received from the console 30 (step S19). That is, X-ray imaging is performed. Steps S11 to S18 are repeatedly executed until the imaging instruction is issued by the user. That is, in a case where the body thickness BT changes because of a change in a state of the subject H or the like, the X-ray imaging condition SC is changed.

As described above, in the technology of the present disclosure, the detection surface region DA is searched for from the distance image DP, the distance to the detection surface region DA that has been searched for is acquired as the first distance D1, and the body thickness BT is derived based on the first distance D1 and the second distance D2. Therefore, the body thickness of the subject can be accurately obtained. As a result, according to the technology of the present disclosure, even a user who is unfamiliar with X-ray imaging can easily perform X-ray imaging with an appropriate radiation dose.

In addition, in a case where a distance (that is, SID) from the X-ray source 10 to the detection surface 20A is set in advance in the X-ray imaging system 2, the body thickness of the subject H can be measured by measuring the distance (that is, SOD) from the X-ray source 10 to the subject H. However, in a portable radiographic imaging system such as the X-ray imaging system 2 of the above-described embodiment, SID information is often not retained, and even in a case where the SID information is retained, an actual SID may be different from the SID information. In a case where the actual SID is different from the SID information, the measurement accuracy of the body thickness of the subject is lowered. On the other hand, in the technology of the present disclosure, the body thickness is derived based on the above-described first distance D1 and second distance D2 regardless of the SID information, so that the body thickness can be accurately obtained.

In the above-described embodiment, the detection surface region DA is detected from the region of interest ROI set at a position corresponding to the end portion of the detection surface 20A. It is also conceivable to set the region of interest ROI to include the entire detection surface 20A. However, a site of the subject H that protrudes outward from the detection surface 20A (a portion of the hand in FIG. 8) may be located on the back side (+Z direction side) with respect to the detection surface 20A when viewed from the distance image camera 40 side. In such a case, in a case where the region of interest ROI is set so as to include the entire detection surface 20A, there is a probability that the distance to the site protruding outward from the detection surface 20A may be erroneously detected as the first distance D1. In order to suppress such erroneous detection, in the above-described embodiment, the region of interest ROI smaller than the region corresponding to the detection surface 20A is set at a position corresponding to the end portion of the detection surface 20A.

Modification Example

Next, various modification examples of the X-ray imaging system 2 according to the above-described embodiment will be described.

In the above-described embodiment, on the premise that the imaging site of the subject H is the abdomen, the detection surface region search unit 71 sets the region of interest ROI at a position corresponding to the corner portion of the detection surface 20A on a lower side (−Y direction side) (see FIG. 5). The detection surface region search unit 71 may change the position of the region of interest ROI according to the imaging site of the subject H.

Figure 12:
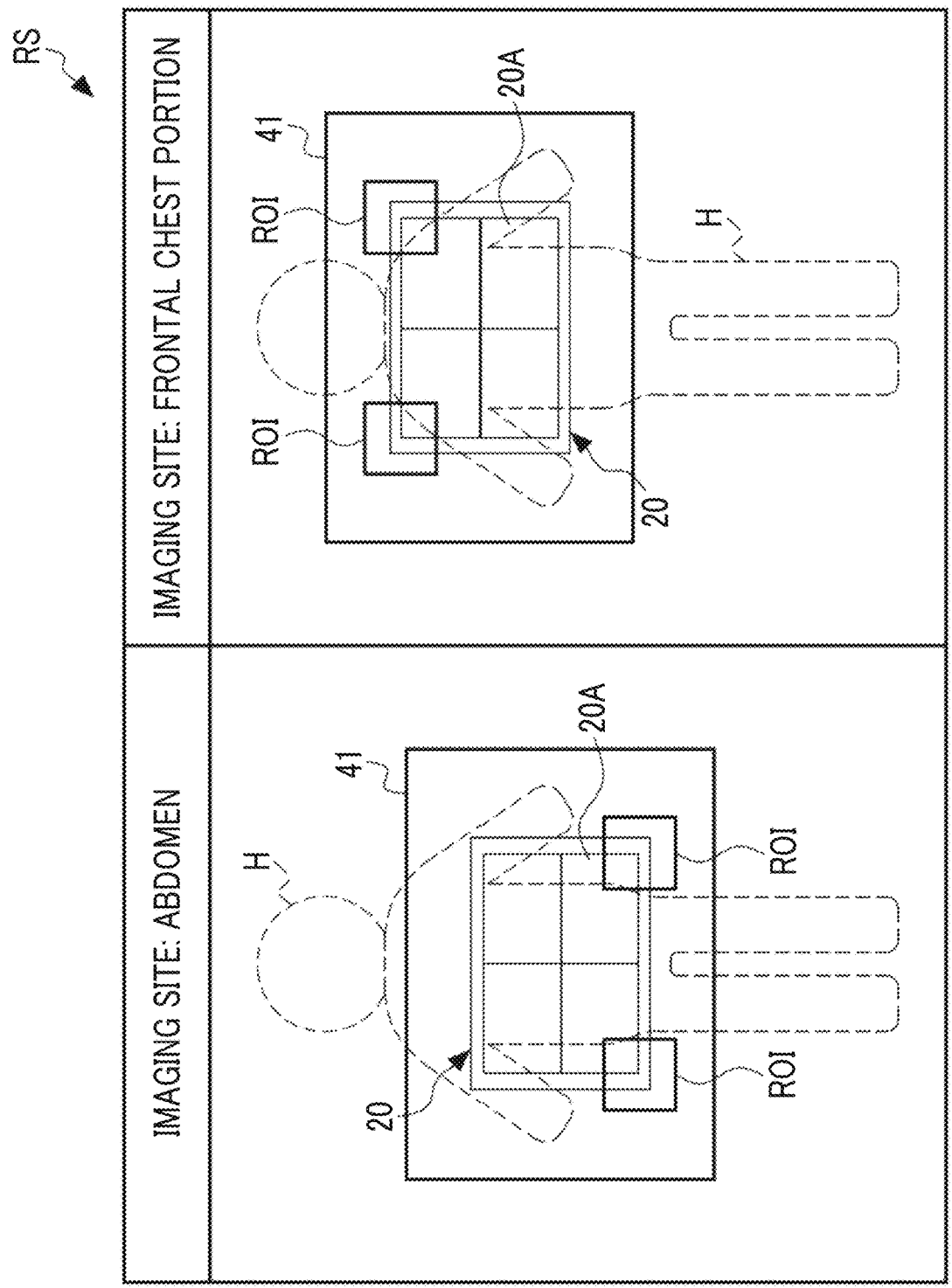
FIG. 12 is a diagram showing an example of region-of-interest information.

In this case, for example, as shown in FIG. 12, region-of-interest information RS in which the imaging site and the position of the region of interest ROI are associated with each other need only be stored in the NVM 35 in advance. The detection surface region search unit 71 need only select the position of the region of interest ROI corresponding to the imaging site based on the above-described imaging site information SP. In the example shown in FIG. 12, the region-of-interest information RS includes information indicating the position of the region of interest ROI corresponding to a case where the imaging site is the abdomen and information indicating the position of the region of interest ROI corresponding to a case where the imaging site is a frontal chest portion. In a case where the imaging site is the frontal chest portion, the upper (+Y direction side) corner portion of the detection surface 20A is exposed without being covered by the subject H. Therefore, the region of interest ROI is positioned at a position corresponding to the upper corner portion of the detection surface 20A.

The region-of-interest information RS is not limited to the abdomen and the frontal chest portion and may include information indicating the position of the region of interest ROI with respect to other imaging sites, such as a lateral chest portion and buttocks.

In addition, in the above-described embodiment, as shown in FIG. 10, in the imaging condition table ST, the body thickness BT and the X-ray imaging condition SC are associated with each other for each imaging site, but information indicating the physique of the subject H may be associated with the body thickness BT and the X-ray imaging condition SC. For example, as shown in FIG. 13, the physique of the subject H may be classified into three categories, that is, "large", "medium", and "small", and the range of the body thickness BT and the X-ray imaging condition SC may be associated with each other for each category. In this case, information indicating the physique corresponding to the X-ray imaging condition SC selected by the selection unit 75 may be displayed on the display unit 31 of the console 30. In addition, the X-ray imaging condition SC corresponding to the selected physique may be settable by the user selecting the physique using the input operation unit 32.

Figure 14:
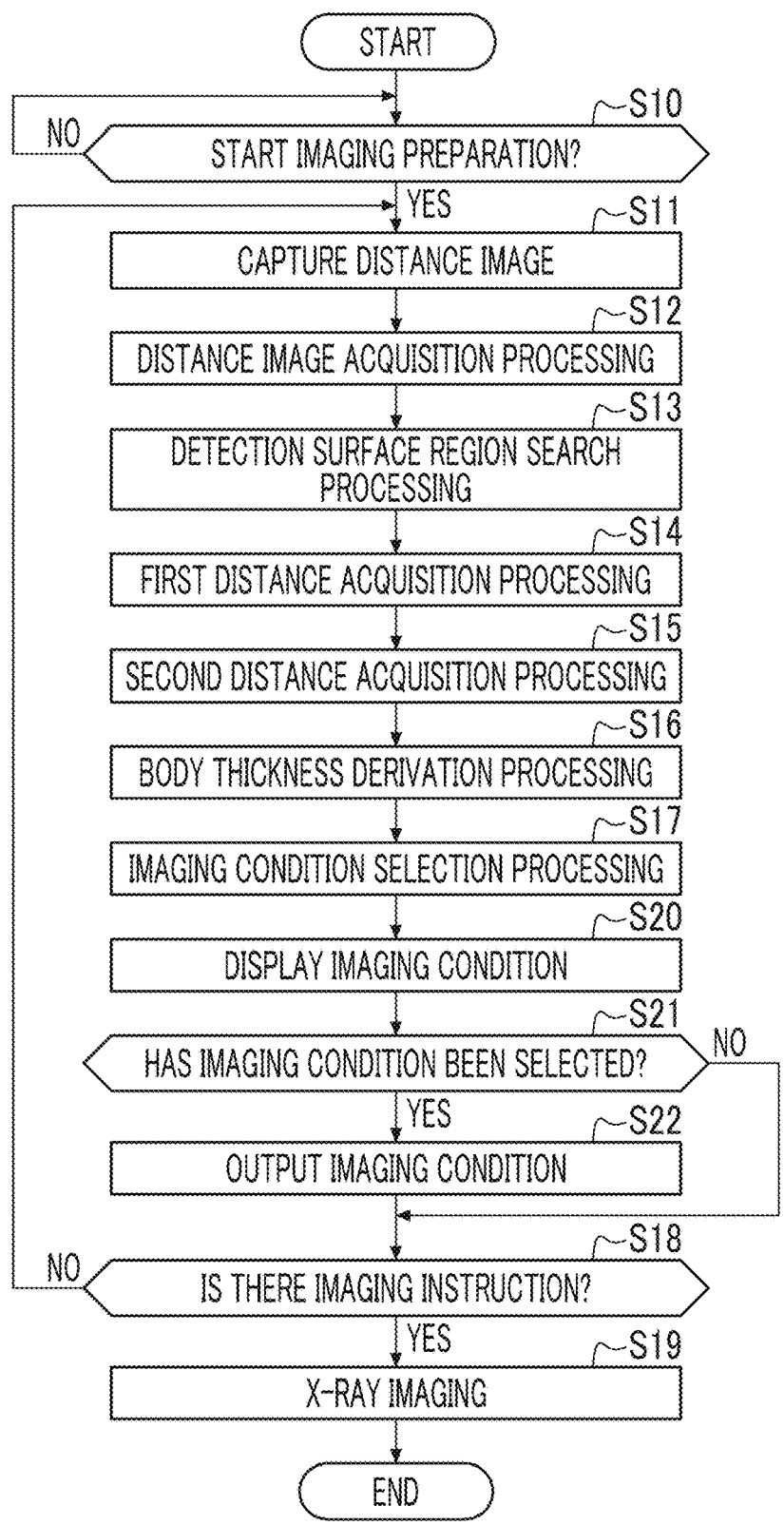
FIG. 14 is a diagram showing a modification example of a flow of processing by the X-ray imaging system.

Further, in the above-described embodiment, the selection unit 75 outputs the X-ray imaging condition SC selected from the imaging condition table ST to the X-ray source 10, but the selected X-ray imaging condition SC may be displayed on the display unit 31 of the console 30 and then the X-ray imaging condition SC selected by the user using the input operation unit 32 may be output to the X-ray source 10. FIG. 14 shows an example of a flow of processing of the X-ray imaging system 2 in this case. In the flowchart shown in FIG. 14, steps S20 to S22 are added between step S17 and step S18 of the flowchart shown in FIG. 11. In step S20, the selection unit 75 displays the X-ray imaging condition SC selected from the imaging condition table ST on the display unit 31 of the console 30. In this case, for example, the selection unit 75 causes the display unit 31 to display the imaging condition table ST shown in FIG. 10 or FIG. 13. The user can select the X-ray imaging condition SC to be used for the X-ray imaging based on the imaging condition table ST with reference to the X-ray imaging condition SC selected by the selection unit 75. That is, the user can perform change to an X-ray imaging condition SC different from the X-ray imaging condition SC selected by the selection unit 75.

The selection unit 75 determines whether or not the user has selected the X-ray imaging condition SC using the input operation unit 32 (step S21). In a case where the X-ray imaging condition SC is selected by the user (step S21: YES), the selection unit 75 outputs the selected X-ray imaging condition SC to the X-ray source 10 (step S22). In a case where the X-ray imaging condition SC is not selected by the user (step S21: NO), the processing proceeds to step S18. Subsequent processing is the same as that of the above-described embodiment.

In the above-described embodiment, the TOF type distance image camera 40 is used, but the distance image camera 40 may be a distance image camera such as a pattern irradiation type other than the TOF type as long as the distance image can be acquired.

Further, in the above-described embodiment, the X-ray imaging system 2 is a portable radiographic imaging system, but the technology of the present disclosure is not limited to the portable radiographic imaging system and can be applied to various radiographic imaging systems. The technology of the present disclosure is particularly suitable for a radiographic imaging system that does not retain the SID information. The X-ray imaging system 2 may be used with, for example, a mobile medical vehicle. In addition, the X-ray imaging system 2 may be a floor-traveling type general X-ray imaging system. The posture of the subject H is not limited to a supine position and may be an upright position. In addition, the X-ray imaging system 2 may be a mammography apparatus that images a breast as the subject H.

In addition, the technology of the present disclosure is not limited to the X-ray and can be applied to a system that images a subject using other radiation such as a γ-ray.

In the above-described embodiment, for example, the following various processors can be used as a hardware structure of a processing unit that executes various types of processing, such as the distance image acquisition unit 70, the detection surface region search unit 71, the first distance acquisition unit 72, the second distance acquisition unit 73, the body thickness derivation unit 74, and the selection unit 75.

Various processors include a CPU, a programmable logic device (PLD), a dedicated electrical circuit, and the like. As is well known, the CPU is a general-purpose processor that executes software (programs) to function as various processing units. The PLD is a processor of which the circuit configuration can be changed after manufacturing, such as a field-programmable gate array (FPGA). The dedicated electrical circuit is a processor having a dedicated circuit configuration designed to execute specific processing, such as an application-specific integrated circuit (ASIC).

One processing unit may be composed of one of these various processors or a combination of two or more of the processors of the same type or different types (for example, a plurality of FPGAs or a combination of a CPU and an FPGA). Alternatively, a plurality of processing units may be composed of one processor. A first example in which a plurality of processing units are composed of one processor is an aspect in which one or more CPUs and software are combined to constitute one processor and the processor functions as the plurality of processing units. A second example is an aspect in which a processor that realizes functions of an entire system including a plurality of processing units with one IC chip is used, as typified by a system-on-chip (SoC) or the like. As described above, various processing units are composed of one or more of the above-described various processors, as the hardware structure.

Further, as the hardware structure of the various processors, more specifically, an electrical circuit (circuitry) in which circuit elements, such as semiconductor elements, are combined is used.

The present disclosure is not limited to the above-described embodiment and various configurations may be employed without departing from the gist of the present disclosure, of course. Further, the present disclosure extends to a computer-readable storage medium that stores the program non-temporarily, in addition to the program.

What is claimed is:

1. An information processing device that is used for a radiographic imaging system including a radiation source and a radiation image detector having a detection surface to which radiation from the radiation source is emitted and on which a subject is positioned, and that performs processing of deriving a body thickness of the subject, the information processing device comprising:
a processor,
wherein the processor is configured to execute:
distance image acquisition processing of acquiring a distance image generated by imaging an imaging range including the subject and the detection surface with a distance image capturing device;
detection surface region search processing of searching the distance image for a detection surface region where a part of the detection surface exists;
first distance acquisition processing of acquiring a distance to the detection surface region that has been searched for, as a first distance from the distance image capturing device to the detection surface, based on the distance image;
second distance acquisition processing of acquiring a distance from the distance image capturing device to the subject as a second distance based on the distance image; and
body thickness derivation processing of deriving a difference between the first distance and the second distance as the body thickness of the subject,
wherein the processor is configured to:
during the detection surface region search processing,
set a region of interest, where the detection surface region is estimated to exist, based on a set value provisionally set as a value corresponding to the first distance and a size of the detection surface; and
search for the detection surface region using the set region of interest as a search range.

2. The information processing device according to claim 1,
wherein the processor is configured to:
during the second distance acquisition processing,
acquire a distance to radiation center coordinates corresponding to a center of a radiation beam emitted from the radiation source toward the subject as the second distance based on the distance image.

3. The information processing device according to claim 1,
wherein the processor is configured to:
during the detection surface region search processing, exclude an abnormal pixel having an abnormal pixel value from the region of interest.

4. The information processing device according to claim 1,
wherein the processor is configured to:
during the detection surface region search processing, set a position of the region of interest according to an imaging site of the subject.

5. The information processing device according to claim 1,
wherein the distance image capturing device is a TOF type distance image camera.

6. A radiographic imaging system comprising:
the information processing device according to claim 1,
wherein a radiographic imaging condition is decided on based on the body thickness derived by the body thickness derivation processing.

7. The radiographic imaging system according to claim 6,
wherein the decided-on radiographic imaging condition is changeable by a user's operation.

8. The information processing device according to claim 2,
wherein the processor is configured to:
during the second distance acquisition processing,
derive the radiation center coordinates based on a relative positional relationship between the distance image capturing device and the radiation source.

9. The information processing device according to claim 3,
wherein the region of interest is a region including an end portion of the radiation image detector and a background outside the radiation image detector.

10. The information processing device according to claim 9,
wherein the processor is configured to:
during the detection surface region search processing, exclude, from the region of interest, a pixel that has a distance equal to or greater than a certain value and corresponds to the background and a flying pixel that appears at a boundary part between the end portion and the background, as the abnormal pixels.

11. An information processing method that is used for a radiographic imaging system including a radiation source and a radiation image detector having a detection surface to which radiation from the radiation source is emitted and on which a subject is positioned, and that includes deriving a body thickness of the subject, the information processing method comprising:
acquiring a distance image generated by imaging an imaging range including the subject and the detection surface with a distance image capturing device;
searching the distance image for a detection surface region where a part of the detection surface exists;
acquiring a distance to the detection surface region that has been searched for, as a first distance from the distance image capturing device to the detection surface, based on the distance image;
acquiring a distance from the distance image capturing device to the subject as a second distance based on the distance image; and
deriving a difference between the first distance and the second distance as the body thickness of the subject,
wherein, during the searching of the detection surface region,
a region of interest, where the detection surface region is estimated to exist, is set based on a set value provisionally set as a value corresponding to the first distance and a size of the detection surface; and
the detection surface region is searched for using the set region of interest as a search range.

12. A non-transitory computer-readable storage medium storing a program that is used for a radiographic imaging system including a radiation source and a radiation image detector having a detection surface to which radiation from the radiation source is emitted and on which a subject is positioned, the program causing a computer to execute a process including deriving a body thickness of the subject, the process comprising:
acquiring a distance image generated by imaging an imaging range including the subject and the detection surface with a distance image capturing device;
searching the distance image for a detection surface region where a part of the detection surface exists;
acquiring a distance to the detection surface region that has been searched for, as a first distance from the distance image capturing device to the detection surface, based on the distance image;

acquiring a distance from the distance image capturing device to the subject as a second distance based on the distance image; and deriving a difference between the first distance and the second distance as the body thickness of the subject, wherein, during the searching of the detection surface region, a region of interest, where the detection surface region is estimated to exist, is set based on a set value provisionally set as a value corresponding to the first distance and a size of the detection surface; and the detection surface region is searched for using the set region of interest as a search range.

\* \* \* \* \*